Feb. 24, 1959 — R. G. LEGROS — 2,874,593
TRANSMISSION MECHANISMS BETWEEN AXLES OR SHAFTS
Filed April 25, 1956 — 3 Sheets-Sheet 1

Inventor
Robert G. Legros
By Ralph B. Stewart
Attorney.

Feb. 24, 1959   R. G. LEGROS   2,874,593
TRANSMISSION MECHANISMS BETWEEN AXLES OR SHAFTS
Filed April 25, 1956   3 Sheets-Sheet 2

Inventor
Robert G. Legros
By Ralph O. Stewart
Attorney

Feb. 24, 1959 R. G. LEGROS 2,874,593
TRANSMISSION MECHANISMS BETWEEN AXLES OR SHAFTS
Filed April 25, 1956 3 Sheets-Sheet 3

Inventor
Robert G. Legros
By Ralph B. Stewart
Attorney

United States Patent Office 2,874,593
Patented Feb. 24, 1959

2,874,593

TRANSMISSION MECHANISMS BETWEEN AXLES OR SHAFTS

Robert Guy Legros, Sevres, France

Application April 25, 1956, Serial No. 580,541

13 Claims. (Cl. 74—796)

The present invention relates to improvements in or relating to means for transmitting an angular displacement of a driving axle to one or a plurality of driven axles and/or for transmitting to one or a plurality of driven axles an angular displacement proportional to the sum or the difference of the angular displacements of a pair of distinct axles.

The present application is a continuation in part application to my co-pending application Serial Number 283,851 filed April 23, 1952, now Patent No. 2,759,375.

One object of the invention is to provide improved means for repeating angular displacements wherein any finite angular rotation of a driving axle, at least, must correspond to a finite angular rotation of any driven axle in a predetermined ratio of the amplitudes of said two rotations.

Another object of the invention is to provide improved means for transmitting an angular speed wherein any rotation speed of a finite value of the driving axle or axles must correspond to a finite angular speed of the driven axle, or of any driven axle, in a predetermined ratio of the rotation speeds of said axles.

It is a further object of the invention to provide angle and speed repeaters wherein the ratios of the amplitudes of the rotations or speeds of rotation can be varied at will, through a continuous adjustment, within relatively large or broad bands of values of angular motions or speed values, and it is a further object of the invention to provide improved means such as hereinabove defined wherein said adjustment of angular motions or speed values can be varied on either side of a zero point; in other words, said means operating through a continuous adjustment to reverse the sense of the rotation of one at least of the driven axles with respect to the sense of rotation of one at least of the driving axles, passing through a "dead point" for which one at least of the driven axle remains still whilst the driving axle or axles rotate.

And it is a further object of the invention to provide such angle and speed repeaters as hereinabove defined wherein the speeds of motion of the driving and driven axles therein may be high without impeding the normal operation of the said means.

The invention will be explained with reference to the accompanying drawings, in which.

Figure 1:
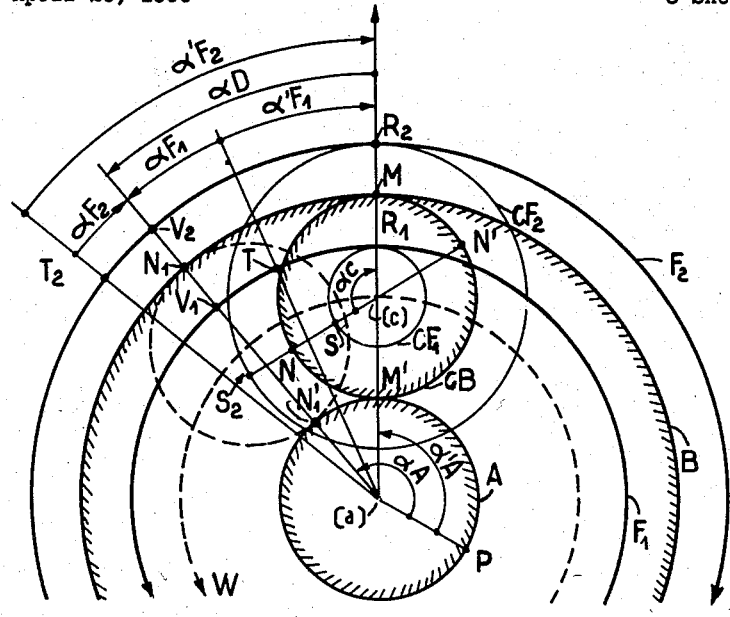
Fig. 1 shows a diagram relating to a displacement translating device according to the invention, for explaining the inherent properties of such a displacement translating device.

Referring first to Fig. 1, a roller or smooth wheel CB is driven in rotation around its axis $(c)$, for instance, by an angular displacement $\alpha_c$. Said roller CB is imperatively guided between two elements, viz. a roller or smooth wheel A and a ring B, and only displaces by rolling without sliding between said guiding elements. The axis $(c)$ of said roller CB can thus be driven along the circumference W and said movement will be effected in the direction of the arrow W if the roller CB rotates on itself according to the direction shown by the arrow marked along the reference line $\alpha_c$. One of the guiding elements at least is assumed to be still, for instance the ring B. The initial position of the roller CB is such as indicated by its contact points, M with the ring B and M' with the wheel A.

When the roller CB has rotated by an angle $\alpha_c$, point N of its periphery is brought at $N_1$ in contact with the still ring B. The angle $\alpha_D$ by which has moved the center $(c)$ of said roller CB is defined by the relation $NM = N_1M$.

If now one considers a roller $CF_1$ upon the same axis $(c)$ as the roller CB, said roller $CF_1$ not being able to rotate with respect to CB, and rolling without sliding upon an annular ring $F_1$ of axis $(a)$, free on said axis $(a)$, the rotation $\alpha_c$ imparted to said roller $CF_1$ brings into contact the point S of $CF_1$ and the point $T_1$ of $F_1$ at the same place marked $V_1$. The rotation angle of $CF_1$ within $F_1$ is $\alpha'_{F1}$ such that $SR_1$ equals $T_1R_1 \cdot R_1$ designates the contact point at the initial position of the roller $CF_1$ with respect to the ring $F_1$.

For this ring $F_1$, all is such that said ring is first rotated by an angle $-\alpha'_{F1}$ in one direction and then by an angle $o_D$ in the reverse direction. The combination of these two angular displacements gives the final relation:

(I) $\qquad \alpha_{F1} = \alpha_D - \alpha'_{F1}$ and the ring $F_1$ rotates in the direction of the arrow it bears.

The radius of the concerned roller $CF_1$ has been taken lower than the radius of the roller CB.

If, on the other hand, one considers a roller $CF_2$ upon the axis $(c)$ of the roller CB, said roller $CF_2$ rolling without sliding within a ring $F_2$, freely mounted on the axis $(a)$, the rotation $\alpha_c$ imparted to said roller $CF_2$ brings into contact, at the place marked $V_2$, points $S_2$ of $CF_2$ and $T_2$ of $F_2$. The rotation angle of $CF_2$ within $F_2$ is $\alpha'_{F2}$ such that $S_2R_2$ equals $T_2R_2 \cdot R_2$ designates the initial contact point of the roller $CF_2$ and the ring $F_2$.

For this ring $F_2$, all stands as if said ring has first been rotated by $-\alpha'_{F2}$ and then a reversed rotation by $\alpha_D$. The combination of these two rotations gives the final result:

(II) $\qquad \alpha_{F2} = \alpha_D - \alpha'_{F2}$ and the ring $F_2$ rotates in the direction of the arrow it bears.

The radius of the concerned roller $CF_2$ has been taken higher than the radius of the roller CB.

The rotations $\alpha'_F$ of the rings F of all radii are of opposite directions with respect to the rotation $\alpha_D$ and, according whether their values are or are not lower than that of $\alpha_D$, said rings are driven in the one or the other directions. This direction of drive is dependent on the relative values of the radii of the rollers CF with respect to the radius of the roller CB. In Fig. 1, when the radius of the roller CF is equal to that of the roller CB, the ring F is stilled. This is as well for a limited drive of the roller CF as for a permanent or continuous drive of said roller at any angular speed.

It must be noted that, with respect to the drive of the roller A from the roller CB, the point P of the roller A is brought at $N'_1$ and not at $M'$ for an angular displacement $\alpha_c$ of the roller CB upon itself. The rotation $\alpha'_A$ is of a direction reverse to that of a rotation $\alpha'_F$ so that the final rotation of the roller A is:

(III) $\qquad \alpha_A = \alpha_D + \alpha'_A$

The above-described properties of a drive such as in Fig. 1 do not depend upon the driving means of the roller CB as the axis $(c)$ is not necessarily the driving axis. It is apparent that, for instance, a rotation of the roller A can control the rotation of the roller CB both upon itself and upon the axis $(a)$ and in this case the ring B only ensures a guiding for the angular displacement of the roller CB. Conversely, the ring B may be the driving element and the roller A may be the guiding element in the drive; and so forth, any one of the components of the structure can be taken as a driving element but one of them has always to be stilled so as to define the relative drives of the other elements.

It must be noted that no practical limitation occurs from the fact that two elements have coincident axis as it suffices to complete the embodiment by means of an auxiliary transmission between one of the rings F, for instance, and an axle of different axis than the axis $(a)$, for driving the latter by the driving element of the system within any mechanically operable ratio of amplitudes or speeds.

Designating $r_{CF}$ the radius of a roller CF clamped upon the axis $(c)$ of the roller CB, and by $r_F$ the radius of the ring F driven by said roller CF, one has:

(IV) $\qquad \alpha_c \cdot r_{CF} = \alpha'_F \cdot r_F$ and designating $r_{CB}$ the radius of the roller CB and $r_B$ the radius of the ring B driven or not, one has:

(V) $\qquad \alpha_c \cdot r_{CB} = \alpha_D \cdot r_B$

From the above Relation I or II, the further relation is then obtained:

(VI) $\qquad \alpha'_F = \alpha_c \cdot (r_{CB}/r_B - r_{CF}/r_F)$ which, for any value of $\alpha_c$, becomes identical to zero when the geometrical relation is observed:

(VII) $\qquad r_{CF}/r_F = r_{CB}/r_B$ and said relation (VII) may also be written:

(VIII) $\qquad r_{CF_0} = r_{CB} \cdot \dfrac{r_F}{r_B}$

When the quantities $r_{CB}$, $r_F$ and $r_B$ are invariant, any ring F of radius $r_{CF}$ higher than $r_{CF_0}$ will be driven in one direction of rotation and any ring F of radius lower than $r_{CF_0}$ will be driven in the other direction of rotation.

In a more definite manner, the object of the invention is to provide an arrangement such that a transmission ratio between at least one driving element and one driven element, of same rotation axis, can be varied in accordance with the above, and more particularly that such a variation can be made in a progressive and continuous manner with a reversal of the direction of rotation on either side of a dead point for which no transmission occurs; said ratio and its variation and said dead point being solely determined by geometrical parameters of the mechanism of transmission.

Figure 2:
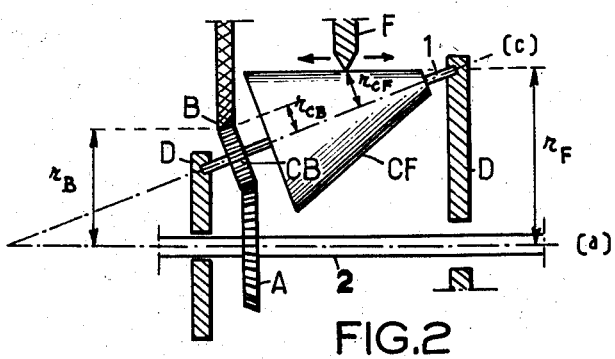
Fig. 2 shows the general arrangement of such a device according to the invention.

Fig. 2 partially shows, in a partial cross-section, a typical scheme of such a mechanism ensuring the transmission of an angular displacement with variable ratio and reversible sign between driving and driven elements. It may be illustratively assumed that F is a driven element and that one of the three other elements A, B or D, is the driving one. Apart the driving element, there will be, in the mechanism, a still or fixed element and a second driven element.

The transmission ratio between the driving element and the concerned driven element can be established from the Relations I to VII supra and also from the additional following relation:

(IX) $\qquad \alpha_c \cdot r_{CB} = \alpha'_A \cdot r_A$ between the elements CB and A.

In the diagram of Fig. 2, elements A, D, B, F are arranged for revolution around the axis $(a)$ and the element D, though indicated in two parts, is constituted as a unitary cage structure for supporting at least one axle 1, of axis $(c)$ having a fixed slope, not equal to zero but lower than 90°, with respect to the axis $(a)$. A plurality of axles such as 1 can be distributed around said axis, all with the same slope, and in practice, several axles 1 are to be provided with a uniform distribution around the axis $(a)$ for balancing the mechanism around said axis.

The provision of said axle 1 of axis $(c)$ with a determined slope with respect to the axis $(a)$, requires a connection through conical gears to be provided between the elements A, B and CB, or at least through conical frictional surfaces between these elements. The radius of the part CB of said gear and the internal radius of the part B, given by constructional data, define the fixed ratio $r_{CB}/r_B$ which has been cited above.

Upon any axle such as the axle 1 which is shown, a conical element CF is clamped, the apex angle of which is equal to the fixed angle between the axis $(a)$ and the axis $(c)$. The internal radius of the ring F is thus determined, said ring F being concentric with axis $(a)$ and constituting for instance and merely for illustrative purpose, a driven member of the mechanism. Further said ring F is so provided as to have its longitudinal position axially varied or shifted in the one and the other directions as indicated by the arrows. Such an axial shift corresponds to a change of the radius $r_{CF}$ and the mechanism thus realizes the possibility of adjusting, by changing the axial position of said ring F, the angular transmission ratio between F and the driving element of the mechanism, on either side of a position wherein $r_{CB}/r_B$ equals $r_{CF_0}/r_F$ and for which the mechanism is at a dead point since F is stilled or stationary.

In the following, and for the sake of clearness only, element A will first be considered as a driving element, being driven itself by an axle 2, and similarly, the element B will be supposed to be fixed; these conditions are by no way limitative per se as it will be hereinafter disclosed.

Figure 3:
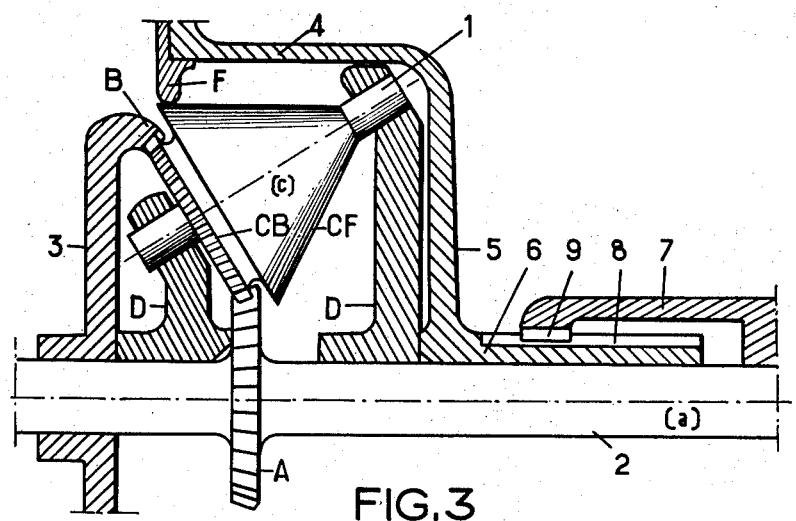
Fig. 3 is a more elaborate embodiment of a displacement translating device featuring the invention.

In such a case, an embodiment of a transmission device according to the invention is more completely shown in Fig. 3. Both parts D supporting the axles 1 constitute together a cage mounted for rotation around the axle 2. The ring B is supported by a member 3 affixed upon an unshown support casing. The ring F is supported through a sleeve 4 integral for instance with a disc portion 5 itself integral to a further sleeve 6, of axis $(a)$, freely rotating around the axle 2. The driven axis 7 is hollow, also of axis $(a)$ and its link with the sleeve 6 may be ensured by one or more fingers such as 9 located within axial slots 8 of said sleeve 6. Thus the unitary structure 6—5—4 which bears the ring F can have its axial position varied for varying the annular contact place between the ring F and the conical rollers CF.

Preferably but not imperatively, the axle 1, the conical rollers CF and the gearing part CB of each roller CF are formed from one piece. In certain embodiments however there will be some advantage to have the roller CF not integral with its axle and, on the other hand, to enable a small amplitude displacement of the conical roller CF upon its axle, said roller being then pressed by means of a spring action towards the part of higher diameter of the support D (or either under the mere action of the centrifugal force), this ensuring a good friction contact between the parts CF and F during the working periods of the mechanism.

It is apparent that the rotation couple transmissible from the axle 2 to the axle 7 will chiefly depend upon the number of conical rollers CF distributed around the axle 2 in the supporting cage D.

It is also apparent that the precision of the adjustment of the ratio will be increased if the angle between the axis (*a*) and any axis (*c*) be reduced, and that the range of its variations will increase if the conical rollers CF are axially lengthened, hence the range of adjustment of the axial position of the ring F is increased.

It is further apparent that the surfaces in contact in the rollers CF and the ring F must be treated for having a wear resistance, for instance by a special process if necessary, the drive at this place of the mechanism being only ensured by the friction between said elements. On the other hand, the drive of the elements CB by the element A can most advantageously be ensured by means of conical toothed gears.

Figure 4:
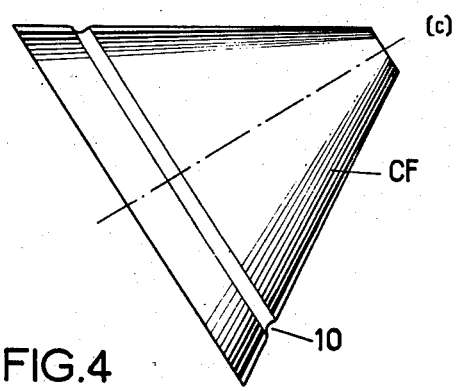
Fig. 4 shows an enlarged view of one of the components in Fig. 3.

As concerns the position of the dead point of such a mechanism, and in order to avoid a rolling and damaging of the rollers, it is further provided to create in the surface of any conical roller CF an annular depression, shown at 10 on the enlarged part in Fig. 4 of a conical roller CF. Said depression is equally distributed as for its width on either sides of the dead point line. The depth of such a depression is necessarily very small and no weakening of the mechanical resistance of the rollers is thus entailed.

Figure 5:
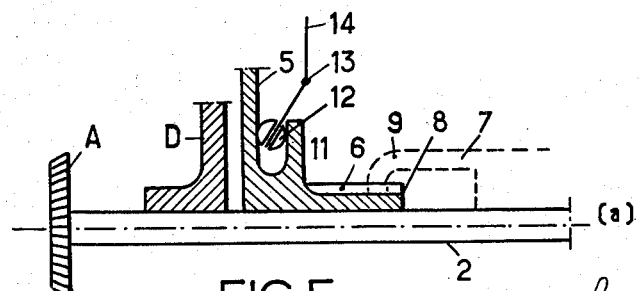
Fig. 5 shows a schematic illustrative embodiment of adjusting means for such a translation device.

Fig. 5 shows a possible embodiment of a control means for shifting the axial position of the ring F with respect to the conical rollers, hence for determining the value of the transmission ratio between the axles 2 and 7. A circular depression 11 is provided within the sleeve 6 and in said depression is located a spherical roller 12 at the end of a lever 14 pivoted at 13 around a fixed point. Any operation of the lever 14 around said pivoting point 13 brings an axial displacement in either directions of the ring F, hence a change in the value of the transmission ratio.

Figure 6:
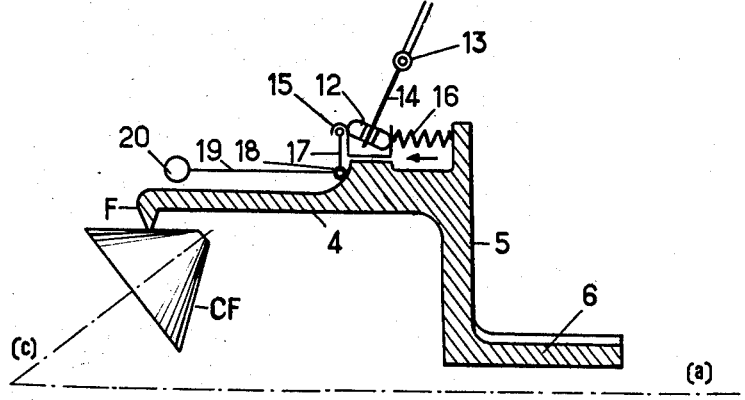
Fig. 6 shows an illustrative embodiment of an angular displacement translating device according to the invention; and, Fig. 7 is a general embodiment of a displacement translating device featuring the present invention.

Fig. 6 indicates a simple means for regulating the speed of rotation of an axle 8, for a determined position of the ring F, when the speed of rotation of the axle 2 has a tendency to drift. Said regulating arrangement is intended for the case when the mechanism is used as a transmission of rotations between two shafts at least. On the other hand, the control device in Fig. 5 was intended mainly for angle repeaters.

A two depression annular portion 15 is so mounted as to slide along the external surface of the part 4. A compression spring 16 presses said annular element 15 in the direction indicated by the arrow.

The end 17 of a cranked lever 17—19 pivoted at 18 upon the cylinder 4 engages one of the said depressions in the element 15. At the other end, said lever carries a ball 20. The axle 18 being fixed, the element 15 can advance only to the point where the ball 20 presses against the wall of the cylinder 4 when the spring 16 acts alone.

The other depression in the annular element 15 receives the spherical roller 12 of the speed controlling lever. By this means, the position of the annular element 15 depends upon the condition of position of the lever 14.

The operation of said regulating arrangement can be easily understood by considering the ring F driven at a certain speed so that a centrifugal force is exerted upon the spherical ball 20, the value of said force corresponding to said speed, which repels to the right the annular element 15 against the action of the spring 16. A balance is automatically obtained in continuous operation if the rotation driving speed of the ring F is stable. If said speed varies around the value set by the lever 14, however, the centrifugal force exerted on the ball 20 changes. An unbalance results between the actions of the lever 17—19 and the spring 16, hence an axial displacement of the ring F together with the linking parts between said ring F and the driven axle 7. If, for instance, the driving speed of F has a tendency to increase, the centrifugal force increases, the spring 16 is compressed and, the annular element 15 being maintained in its position through the lever 14, an axial translation of F occurs in the direction of the increasing radii of the rollers CF, hence in the direction of the decreasing driving speeds. It is apparent that the regulating action may be obtained from an appropriate calibration of the spring 16, together with the lever arms 17—19 and the mass of the ball 20. Several regulating arrangements of this kind can, if required, be arranged around a single annular element 15.

It is to be understood that the arrangements in Fig. 5 and Fig. 6 are only indicative and may be replaced by any control arrangements as desired for controlling a translation movement of a ring upon a cylindrical surface.

It must be emphasized that the operativeness and flexibility of a transmission mechanism according to the invention essentially result from the provision therein of four separtive and active members, viz. with reference to Fig. 2, the wheel or roller A, the conical roller supporting cage D, and the two rings B and F. For operating such a mechanism, as said, two of these four elements are idle, and consequently will be driven members in the transmission, one of the remaining two is controlled for acting as a driving member and the remaining one is held stationary for providing the mechanical reaction necessary for the efficiency of the overall operation of the device.

Figure 7:
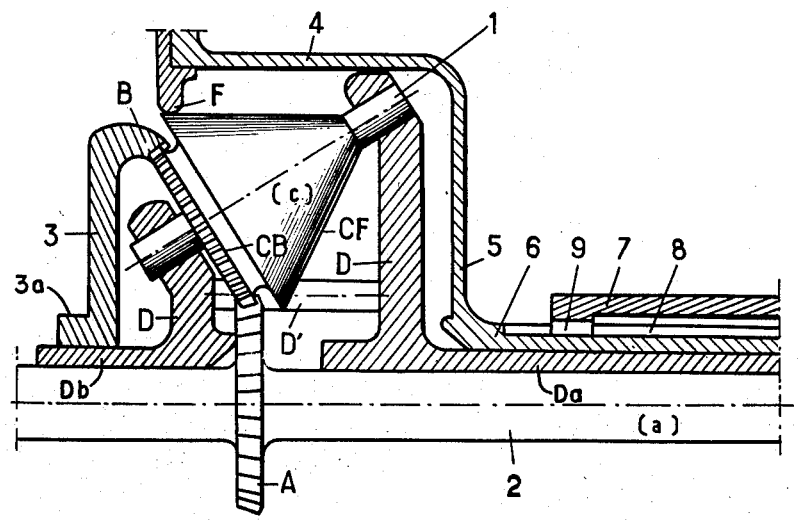

In order to enable the practical use of any and all of the possibilities of the system, it will be of advantage as shown in Fig. 7, to support the cage D by means of a sleeve surrounding axle 2 on both sides of the sun gear A, and consequently the sleeve 6 supporting the ring F passes around one of the extensions Da of the said cage-supporting sleeve, whereas a ring-supporting sleeve 3a is also provided around the other extension Db of the cage supporting sleeve for supporting the ring B. Each and any of the four members of the device can in this fashion be reached for the control thereof according to a variety of combinations which may be listed as follows:

| No | Driving member | Stationary member | Driven members |
|---|---|---|---|
| 1a | A | B | D and F |
| 1b | A | D | F and B |
| 1c | A | F | B and D |
| 2a | B | A | D and F |
| 2b | B | D | F and A |
| 2c | B | F | A and D |
| 3a | D | A | B and F |
| 3b | D | B | F and A |
| 3c | D | F | A and B |
| 4a | F | A | B and D |
| 4b | F | B | D and A |
| 4c | F | D | A and B | and to which the following comments may be applied:

In the case 1a, the speed ratio between A and F is adjustable through an axial adjustment of F, but the speed ratio between A and D is not;

In the case 1b, the speed ratio between A and F is adjustable, but the speed ratio between A and B is not;

In the case 1c, the speed ratios between A and B, and A and D, are both adjustable through the axial adjustment of F;

In the case 2a, the speed ratio between B and F is adjustable but the speed ratio between B and D is not;

In the case 2b, the speed ratio between B and F is adjustable but the speed ratio between B and A is not;

In the case 2c, the speed ratio between B and A and the speed ratio between B and D are adjustable but the transmission blocks for the four equal speeds;

In the case 3a, the speed ratio between D and F is adjustable but the speed ratio between D and B is not;

In the case 3b, the speed ratio between D and F is adjustable but the speed ratio between D and A is not;

In the case 3c, the speed ratio between D and B is adjustable but the speed ratio between D and A is not;

In the case 4a, the speed ratios between F and D and between F and B are both adjustable;

In the case 4b, the speed ratios between F and D and F and A are adjustable, but the mechanism blocks for the equal values of the speeds of the four members therein;

In the case 4c, both speed ratios between F and A and between F and B are adjustable.

When the mechanism must be used with two driven members each one being of an adjustable speed with respect to the speed of the driving member, cases 1c and 4a are of special interest; cases 2c and 4b would be but actually are to be avoided since blocking points appear in the operation thereof.

In another respect, in the cases 2a and 2b, there exists an adjustment for which the speeds of rotation of B and F are equal and this also is the case for the combination 4a and for the combination 4c; this may be valuable in the use of such a mechanism as a speed comparator and regulator device when for instance a speed regulating adjustment such as shown in Fig. 6 is used and set to this value of adjustment.

Instead of taking this equality of value as a reference, one may use certain combinations wherefor one of the member comes to rest (zero speed) for a special adjustment of the axial position of the ring F. This will be the case with the combination 1b wherefor, at a definite adjustment, the said ring F will come to rest, and also with the combination 1c wherefor a certain adjustment of the ring F the other ring, B, will come to rest. The same applies to the combination 3c, the member coming to rest for a certain adjustment of F being the ring B, and to the combination 3b, the member coming to rest in the said combination being F.

It is quite obvious that the flexibility of use of a mechanism according to the invention is obtained from the provision of a separate member D for supporting the conical rollers, as this member plays then the part of an additional relaying component, acting as a speed intermediate "stage" between the members A and B, on the one part, and between F and B or A, on the other part, according to what combination of driving, fixed and driven members is chosen by the user of the device.

Having thus described and ascertained my invention, I claim:

1. A transmission mechanism between axles or shafts including, in combination, a first element comprising a main axle and a sun wheel secured thereto at a point intermediate its ends; a second element comprising a cage surrounding the said main axle and having spaced portions thereof journalled to rotate about the axis of the said main axle on opposite sides of said sun wheel, a plurality of satellite wheels each carried by a satellite axle mounted on said cage for rotation about individual axes inclined to the axis of the said main axle by an angle less than 90° and a conical roller carried by each satellite gear and having an apex angle such that the outer surfaces of said conical rollers are parallel with the axis of said main axle; a third element comprising a ring gear surrounding said main axle and being journalled to rotate about the axis of said main axle in engagement with the said satellite gears; and a fourth element comprising an annular ring having frictional contact with the outer surfaces of said conical rollers, means for mounting said annular ring for rotation about the axis of said main axle and for sliding movement parallel with said axis; a first rotary shaft connected in driving relation with one of the said four elements; a second rotary shaft connected in driving relation with another of the said four elements; means for holding stationary another one of the said four elements; and means for controlling the axial position of said annular ring.

2. A transmission mechanism between axles or shafts according to claim 1, including a third rotary shaft connected in driving relation with the remaining one of the said four elements.

3. A transmission mechanism between axles or shafts according to claim 1, wherein the said second shaft is driven from that element of the mechanism the speed ratio of which with respect of the speed of the first driving shaft is adjustable through the control of the axial position of said annular ring.

4. A transmission mechanism between axles or shafts according to claim 2, wherein the said second and third shafts are driven from elements the speed ratios of which with respect to the speed of the first driving shaft are both adjustable through the control of the axial position of said annular ring.

5. A transmission mechanism between axles or shafts according to claim 1, wherein each portion of the said cage is carried by a sleeve journalled upon the said main axle on opposite sides of the said sun wheel, and each ring or annular member is also carried by a sleeve journalled upon one of the said cage-bearing sleeves.

6. A transmission mechanism according to claim 2, wherein the first element is the driving member of the mechanism, and the annular ring is the adjustable speed driven member of the said mechanism.

7. A transmission mechanism according to claim 2, wherein the first element is the driving element and the annular ring is the fixed element of the mechanism, either of the two remaining elements being members driven at an adjustable speed ratio with respect to the first.

8. A transmission mechanism according to claim 2, wherein the third element is the driving member of the mechanism and the annular ring is the adjustable speed driven member therein.

9. A transmission mechanism according to claim 2, wherein the second element is the driving member of the mechanism and the annular ring is the adjustable speed driven member therein.

10. A transmission mechanism according to claim 2, wherein the second element is the driving member of the mechanism, the annular ring is stationary, and the third element is the adjustable speed driven member therein.

11. A transmission mechanism according to claim 2, wherein the annular ring is the driving member in the mechanism and the third element one of the driven members therefrom at a speed adjustable with respect to that of the annular ring and wherein the other driven member therein is also driven at an adjustable speed ratio with the said annular ring.

12. A transmission mechanism according to claim 2, and including means for so controlling the axial position of the said annular ring that the two speeds of the said annular ring and of the said third ring element are equal.

13. A transmission mechanism according to claim 2, and including means for so controlling the axial position of the said annular ring that the speed of one of the said driven elements is made zero.

References Cited in the file of this patent

UNITED STATES PATENTS

| | | |
|---|---|---|
| 2,062,901 | Graham | Dec. 1, 1936 |
| 2,574,530 | Castagna | Nov. 13, 1951 |
| 2,759,375 | Legros | Aug. 21, 1956 |